United States Patent
Yamada et al.

(10) Patent No.: US 11,142,153 B2
(45) Date of Patent: Oct. 12, 2021

(54) VEHICLE-BODY STRUCTURE

(71) Applicant: MAZDA MOTOR CORPORATION, Hiroshima (JP)

(72) Inventors: Ken Yamada, Hatsukaichi (JP); Koji Matsushita, Hiroshima (JP); Hidenori Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 89 days.

(21) Appl. No.: 16/568,731

(22) Filed: Sep. 12, 2019

(65) Prior Publication Data
US 2020/0094760 A1    Mar. 26, 2020

(30) Foreign Application Priority Data
Sep. 26, 2018  (JP) .............................. JP2018-180470

(51) Int. Cl.
*B60R 19/34* (2006.01)
*B60R 19/18* (2006.01)

(52) U.S. Cl.
CPC .............. *B60R 19/34* (2013.01); *B60R 19/18* (2013.01)

(58) Field of Classification Search
CPC ................................ B60R 19/24; B60R 19/34
USPC ................................................. 293/133, 155
See application file for complete search history.

(56) References Cited

U.S. PATENT DOCUMENTS

| | | | |
|---|---|---|---|
| 2010/0148526 A1* | 6/2010 | Karlander | B60R 19/34 293/155 |
| 2015/0336526 A1* | 11/2015 | Handing | B60R 19/34 293/133 |
| 2017/0120850 A1* | 5/2017 | Sugano | B60R 19/34 |

FOREIGN PATENT DOCUMENTS

JP   2013-233898 A   11/2013

* cited by examiner

*Primary Examiner* — Dennis H Pedder
(74) *Attorney, Agent, or Firm* — Studebaker & Brackett PC (57) ABSTRACT

A vehicle-body structure comprises a pair of right-and-left crash cans provided at an end portion of a vehicle body, being spaced apart from each other in a vehicle width direction, a bumper reinforcement extending in the vehicle width direction and connecting respective tip portions of the crash cans, set plates interposed between each of the crash cans and a vehicle-body side frame, wherein each of the crash cans is fixed to the vehicle-body side frame via the set plates, and a brace extending obliquely, in a plan view, from an inward side, in the vehicle width direction, of the crash can or the set plate to the bumper reinforcement such that a space is formed, in the vehicle with direction, between the brace and the crash can. The brace is fixedly joined to a lower face of the bumper reinforcement.

3 Claims, 6 Drawing Sheets

VEHICLE-BODY STRUCTURE

BACKGROUND OF THE INVENTION

The present invention relates to a vehicle-body structure which comprises a pair of right-and-left crash cans provided at an end portion of a vehicle body, being spaced apart from each other in a vehicle width direction, and a bumper reinforcement extending in the vehicle width direction and connecting respective tip portions of the crash cans.

In general, a front bumper provided at a vehicle front portion or a rear bumper provided at a vehicle rear portion are configured so that a collision load generated in a light vehicle collision can be absorbed by a bumper reinforcement and crash cans only without deformation of the vehicle body, and that these bumpers are recoverable by replacing the bumper reinforcement and the crash cans only after the vehicle collision.

Meanwhile, in a case of a vehicle having a relatively-high height, such as SUV (sports utility vehicle), concentration of the collision load occurs at a lower part of the bumper in the vehicle collision. In this case, there is a possibility that the bumper reinforcement and the crash cans move rotationally downwardly around their connection portions to a vehicle-body side frame (a front side frame or a rear side frame). This moving may be suppressed by strengthening connection of the bumper reinforcement to the vehicle-body side frame or a rear end of the vehicle body.

However, in a case where a structure with this strengthened connection is applied, this structure application so influences on the vehicle body even in the light vehicle collision that mere replacement of the bumper reinforcement and the crash cans only may not work. Thus, there is room for improvement from a viewpoint of repairability.

Herein, Japanese Patent Laid-Open Publication No. 2013-233898 discloses a vehicle-body structure in which a gusset extending obliquely rearwardly is provided between a rear bumper beam and a set plate provided at a rear end of a rear side frame. This gusset transmits a load from the rear bumper beam in a vehicle rear collision. In a case where the conventional structure disclosed in the above-described patent document is applied to the above-described vehicle having the relatively-high height, such as SUV, since the above-described gusset has a vertical height which is equivalent to an entire height of the crash can, the rear bumper beam and the crash can move rotationally downwardly together with the gusset when there occurs the load concentration at the lower part of the bumper.

SUMMARY OF THE INVENTION

Accordingly, an object of the present invention is to provide a vehicle-body structure of the vehicle having the relatively-high height which can properly secure the repairability in the light vehicle collision, preventing the downwardly-rotationally moving of the bumper reinforcement and the crash can, when the collision load is inputted below the bumper reinforcement and the crash can.

The present invention is a vehicle-body structure, comprising a pair of right-and-left crash cans provided at an end portion of a vehicle body, being spaced apart from each other in a vehicle width direction, a bumper reinforcement extending in the vehicle width direction and connecting respective tip portions of the crash cans, a set plate interposed between each of the crash cans and a vehicle-body side frame, wherein each of the crash cans is fixed to the vehicle-body side frame via the set plate, and a brace extending obliquely, in a plan view, from an inward side, in the vehicle width direction, of the crash can or the set plate to the bumper reinforcement such that a space is formed, in the vehicle with direction, between the brace and the crash can, wherein the brace is fixedly joined to a lower face of the bumper reinforcement.

According to the present invention, when the collision load is inputted below the bumper reinforcement and the crash can, the downwardly-rotationally moving of the bumper reinforcement and the crash can be prevented by the brace.

Further, since the space is formed, in the vehicle with direction, between the brace and the crash can and the brace is a single member, the vehicle-body structure according to the present invention does not influence on the vehicle body in the light vehicle collision, thereby securing the repairability.

Thus, preventing of the downwardly-rotationally moving of the bumper reinforcement and the crash can when the collision load is inputted below the bumper reinforcement and the crash can and securing of the repairability in the light vehicle collision can be compatibly attained.

In an embodiment of the present invention, the brace comprises a vertical-directional face portion which is fixedly joined to a face of a side of the bumper reinforcement which is positioned closely to the vehicle body.

According to this embodiment, since the bumper reinforcement is supported by the brace at its vertical-directional face portion as well as its lower face, a large support face can be secured.

Further, an improper arch-shaped deformation of the bumper reinforcement in a case where the collision load is inputted to a central portion, in the vehicle width direction, of the bumper reinforcement can be suppressed by the vertical-directional face portion of the brace. That is, the bumper reinforcement is generally configured in a curved shape such that its central portion, in a plan view, protrudes outwardly (a central portion of a front bumper reinforcement protrudes forwardly, a central portion of a rear bumper reinforcement protrudes rearwardly), so that in the case where the collision load is inputted to this central portion, the bumper reinforcement tends to be deformed in an arch shape such that an end portion, in the vehicle width direction, thereof is bent outwardly. According to this embodiment, however, since the brace comprises the above-described vertical-directional face portion, this arch-shaped deformation of the bumper reinforcement can be properly suppressed by this vertical-directional face portion.

In another embodiment of the present invention, the brace is connected to the set plate at a base end portion thereof which is located at a lower level than a cross-sectional center, in a vertical direction, of the crash can.

According to this embodiment, since the bumper reinforcement which is going to move rotationally downwardly is supported by the brace which is connected to the set plate at its base end portion located at the lower level than the cross-sectional center, in the vertical direction, of the crash can, preventing of the downwardly-rotationally moving of the bumper reinforcement and the crash can be attained more securely.

Other features, aspects, and advantages of the present invention will become apparent from the following description which refers to the accompanying drawings.

DETAILED DESCRIPTION OF THE INVENTION

Figure 1:
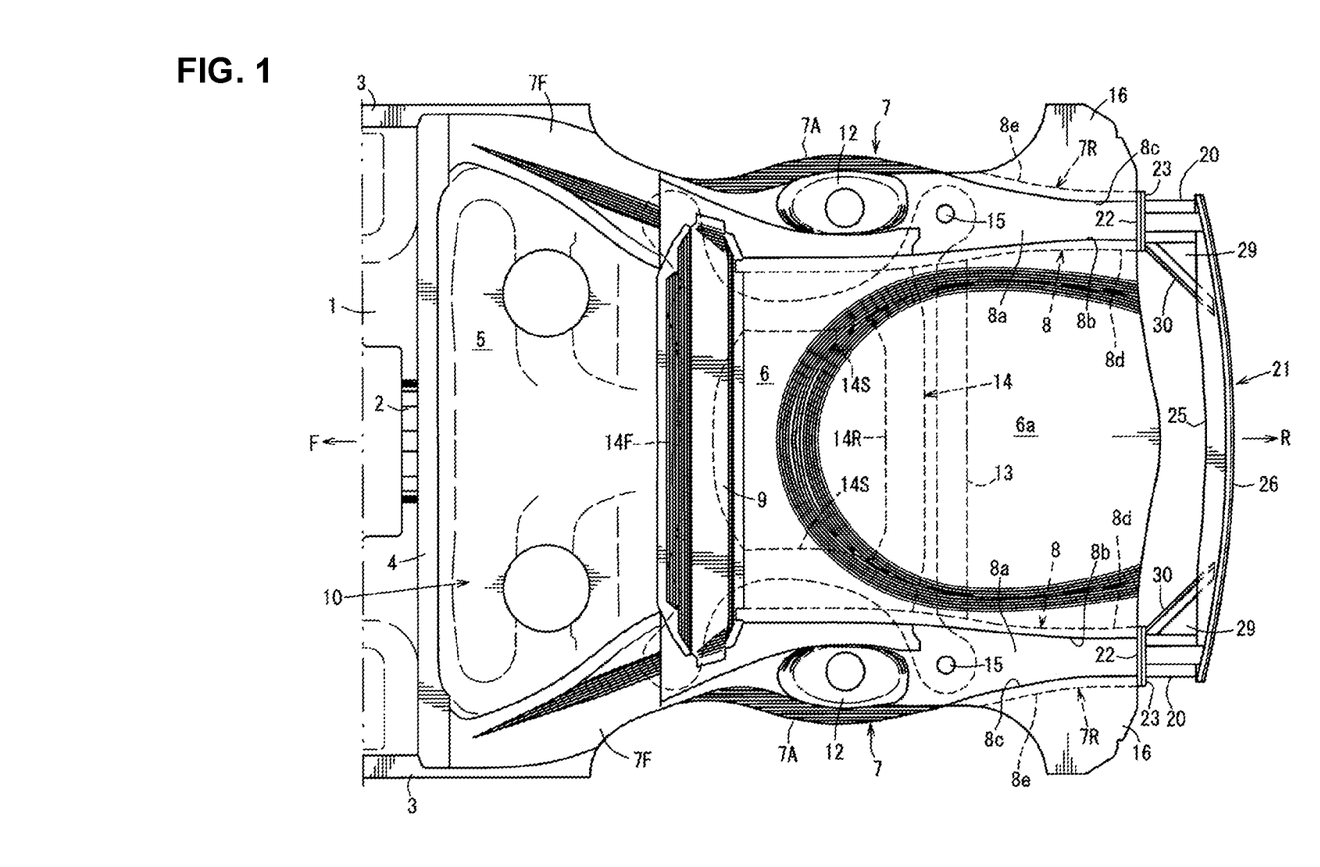
FIG. 1 is a plan view showing a vehicle-body structure of the present invention.
Figure 2:
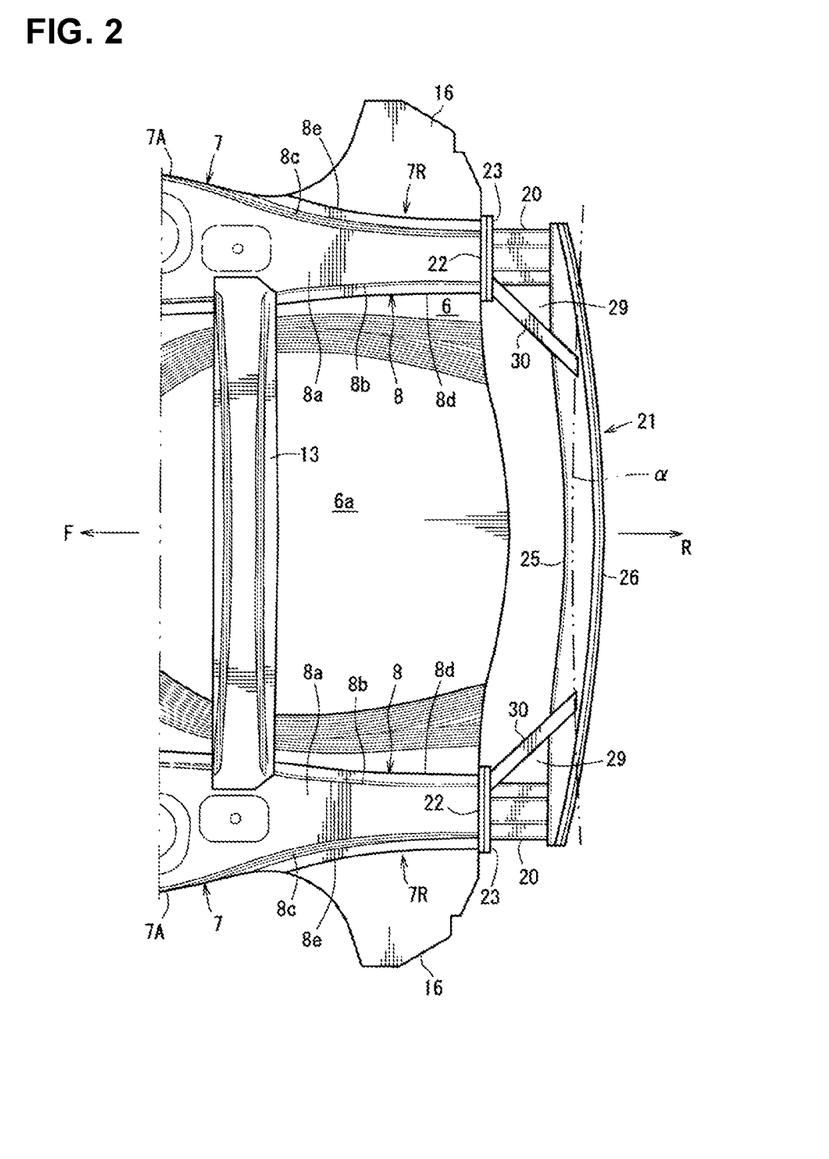
FIG. 2 is a bottom view of a major part of FIG. 1.
Figure 3:
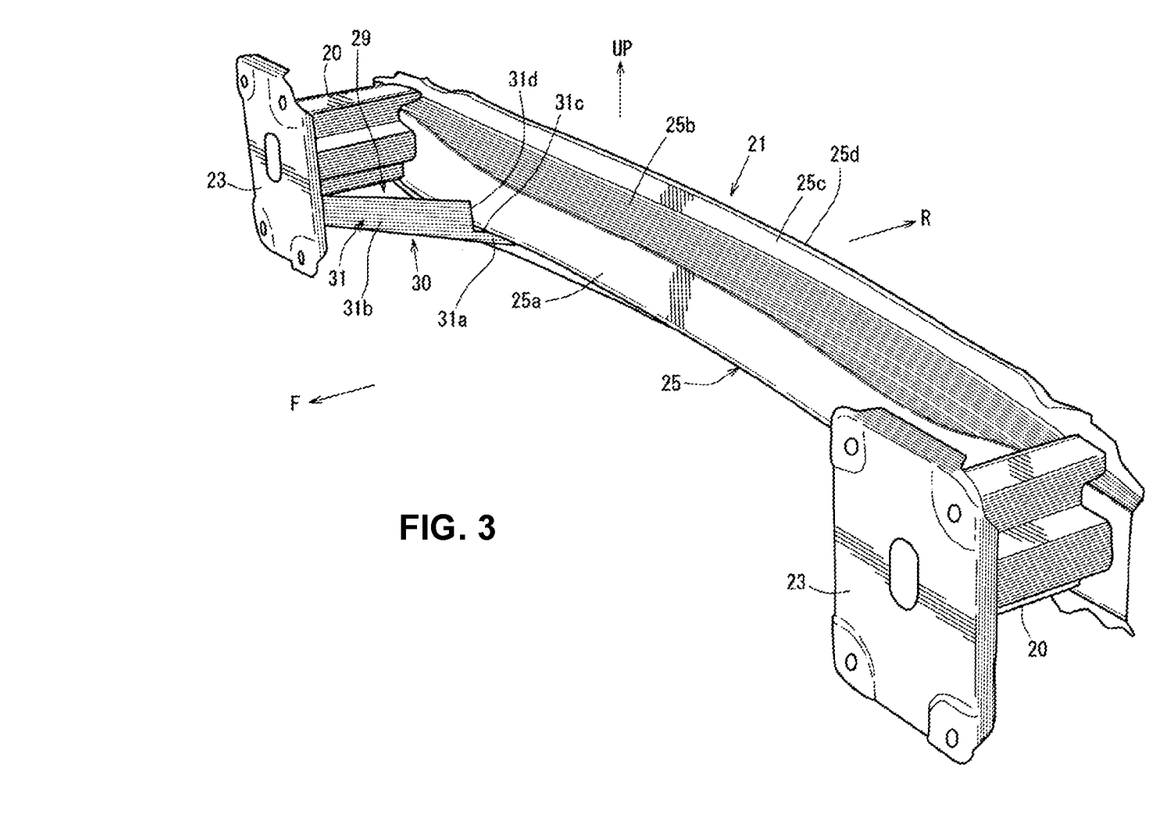
FIG. 3 is a perspective view showing crash cans, a bumper reinforcement, and braces.
Figure 4:
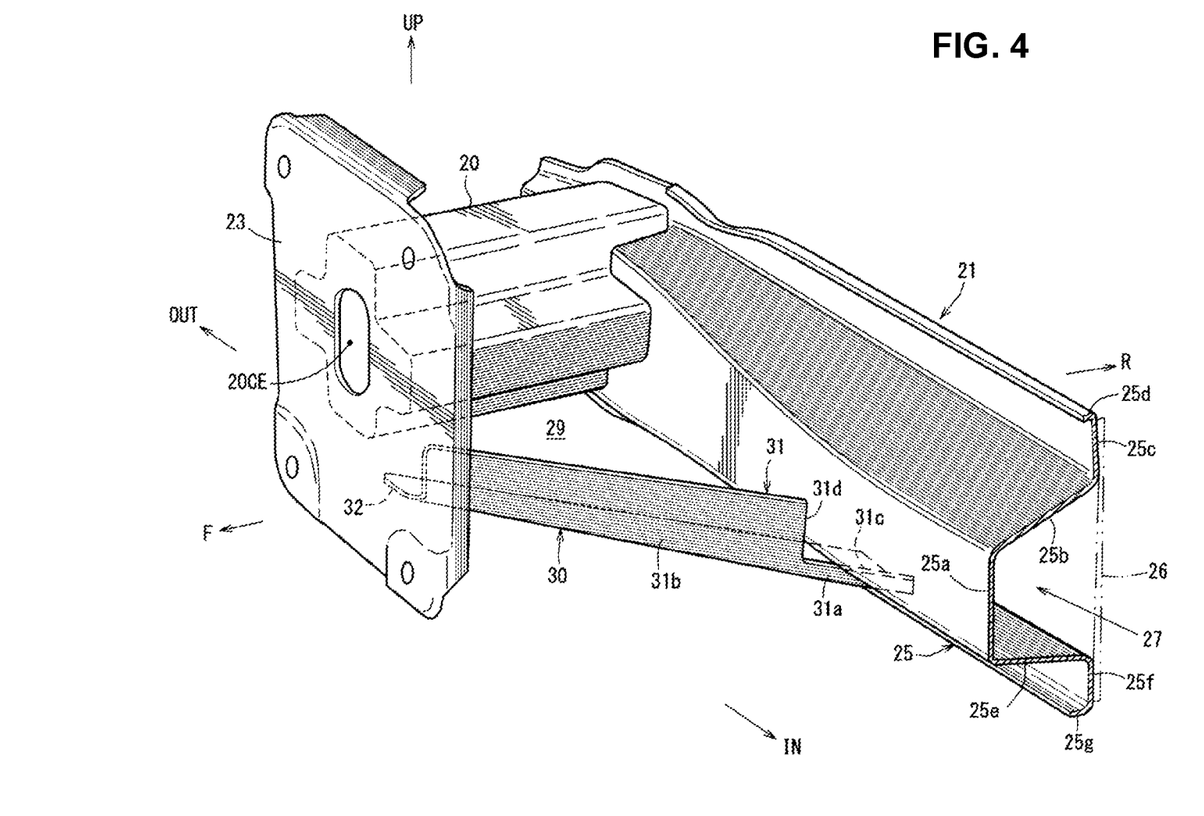
FIG. 4 is an enlarged perspective view of a major part of FIG. 3.
Figure 5:
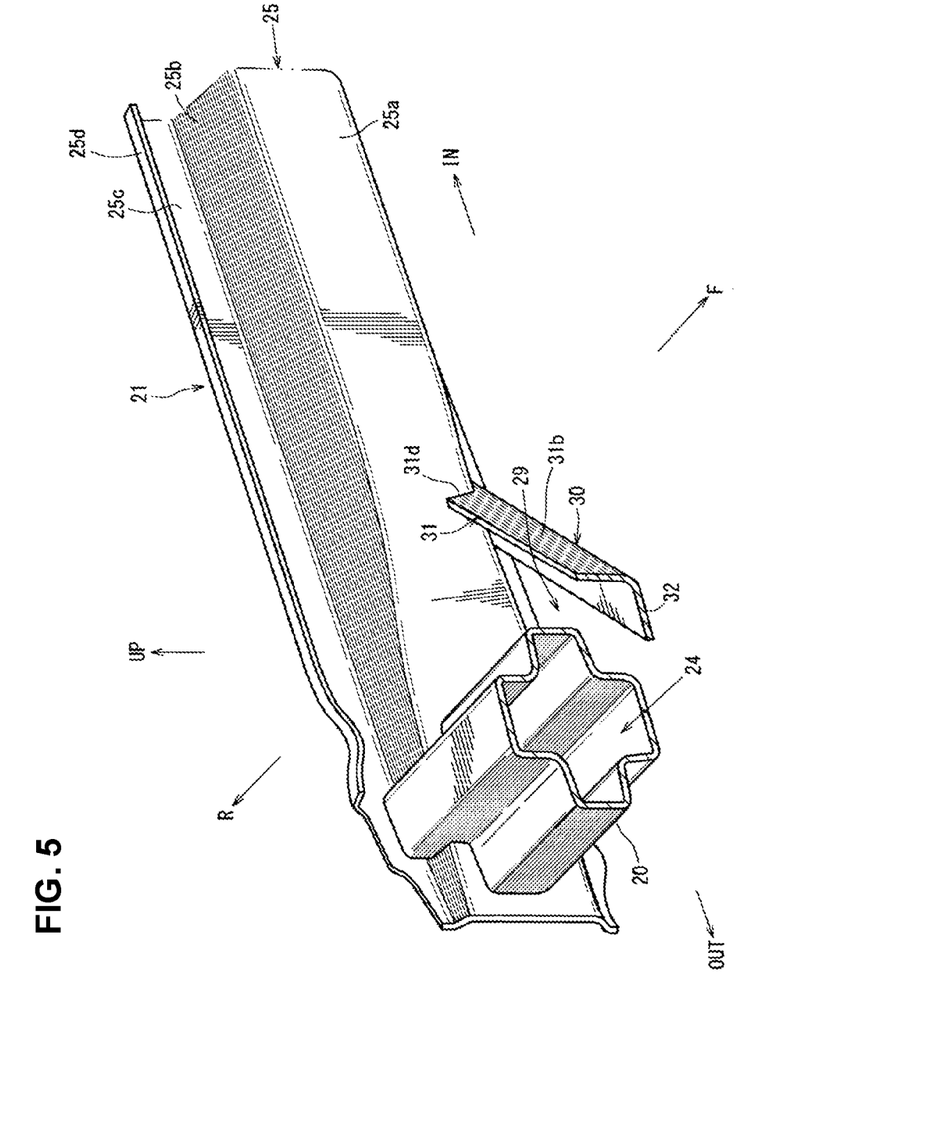
FIG. 5 is a perspective view showing the crash can, the bumper reinforcement, and the brace, when viewed from an upper and outward side, in a vehicle width direction, of a vehicle.
Figure 6:
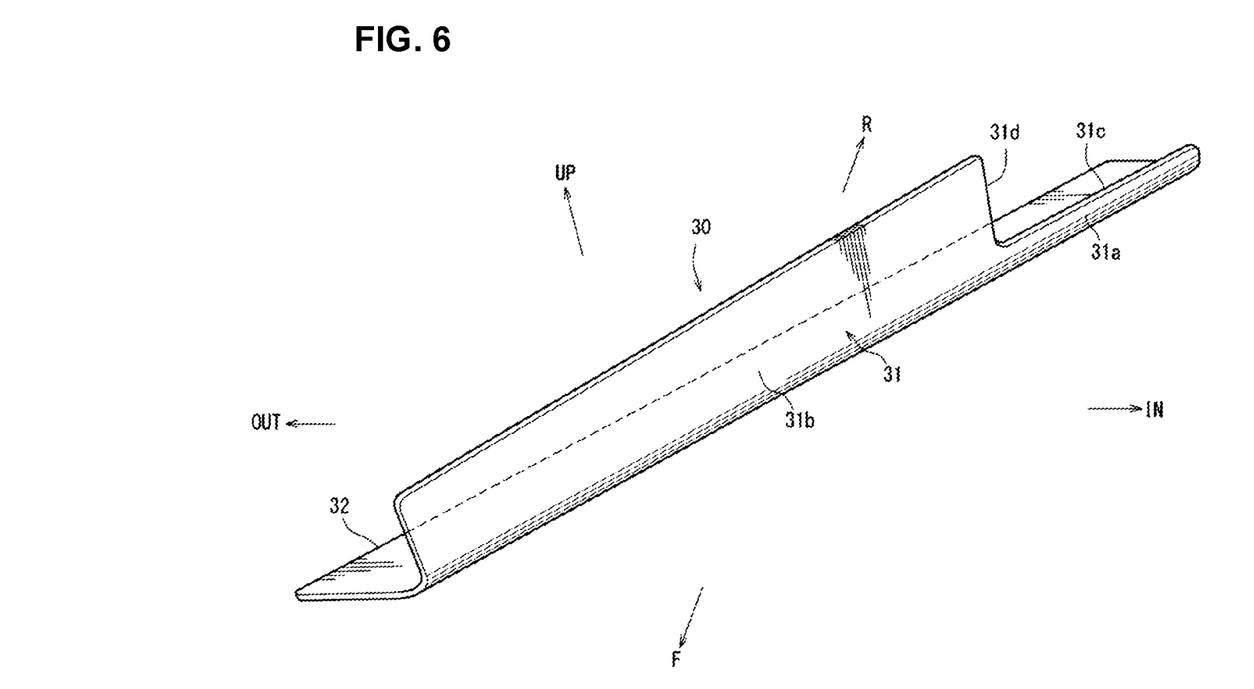
FIG. 6 is a perspective view of the brace.

Hereafter, an embodiment of the present invention will be specifically described referring to the drawings. The figures show a vehicle-body structure, and FIG. 1 is a plan view showing the present vehicle-body structure, FIG. 2 is a bottom view of a major part of FIG. 1, FIG. 3 is a perspective view showing crash cans, a bumper reinforcement, and braces, FIG. 4 is an enlarged perspective view of a major part of FIG. 3, FIG. 5 is a perspective view showing the crash can, the bumper reinforcement, and the brace, when viewed from an upper and outward side, in a vehicle width direction, of a vehicle, and FIG. 6 is a perspective view of the brace.

While the vehicle-body structure of the present invention is applicable to any of a front vehicle-body structure and a rear vehicle-body structure, a case where this is applied to the rear vehicle-body structure will be described in the following embodiment. In FIG. 1, a floor panel 1 which forms a floor face of a cabin is provided, a tunnel portion 2 is formed at a central portion, in the vehicle width direction, of the floor panel 1, and side sills are connected to right-and-left both sides, in the vehicle width direction, of the floor panel 1.

The side sill is a vehicle-body reinforcing member, which comprises a side sill inner 3 and a side sill outer (not illustrated) which are fixedly joined together and has a closed cross section extending in a vehicle longitudinal direction. A kick-up portion which rises upwardly from a rear end of the floor panel 1 and then extends rearwardly is provided at the rear end of the floor panel 1, where a cross member 4 (a so-called No. 3 cross member) which extends in the vehicle width direction between a pair of right-and-left side sills and interconnects respective front end portions of a pair of rear side frames, which will be described later, is provided.

A rear seat pan 5 which extends rearwardly is integrally formed at or integrally connected to the rear end of the floor panel 1 via the above-described kick-up portion. A rear seat is mounted on the rear seat pan 5, and a fuel tank is disposed below the rear seat pan 5.

A rear floor pan 6 which forms a bottom face of the cabin is provided behind the rear seat pan 5, and a recess portion 6a which is configured to be concaved downwardly is integrally formed at a central portion, in the vehicle width direction, of the rear floor pan 6. This recess portion 6a serves as a spare tire pan or a parts storage.

As shown in FIG. 1, a pair of right-and-left rear side frames 7, 7 as a vehicle-body side frame are provided at both sides, in the vehicle width direction, of the rear seat pan 5 and the rear floor pan 6. This rear side frame 7 is a vehicle-body reinforcing member, which comprises a rear side frame upper and a rear side frame lower 8 which are fixedly joined together and has a closed cross section extending in the vehicle longitudinal direction.

Further, the above-described rear side frame 7 comprises a middle part 7A which is located at its middle position in the longitudinal direction and configured to be wider, in the vehicle width direction, than any other part, a front part 7F which is configured to extend obliquely forwardly-and-downwardly from the middle part 7A, and a rear part 7R which is configured to substantially horizontally extend rearwardly from the middle part 7A.

As shown in FIG. 1, a rear cross member 9 (a so-called No. 4 cross member) which interconnects the pair of right-and-left rear side frames 7, 7 in the vehicle width direction is provided at a boundary, in the longitudinal direction, between the rear seat pan 5 and the rear floor pan 6.

Herein, the rear seat pan 5 and the rear floor pan 6 form the rear floor panel 10 together, and a closed cross section which extends in the vehicle width direction is formed between the rear cross member 9 and the rear floor panel 10.

A damper support member 12 for supporting a damper of a rear suspension is provided at the above-described wide middle part 7A of the rear side frame 7. This damper support member 12 is made of a substantially-elliptical tubular member having a top plate, has a hollow portion which is opened downwardly, and is configured to protrude upwardly beyond the rear side frame lower 8.

As shown in the bottom view of FIG. 2, a rear-end-portion cross member 13 (a so-called No. 4.5 cross member) which interconnects the pair of right-and-left rear side frames 7, 7, specifically the pair of right-and-left rear side frame lowers 8, 8, in the vehicle width direction is provided at a position located just behind the above-described damper support members 12, and a closed cross section extending in the vehicle width direction is formed between this rear-end-portion cross member 13 and a lower face of the rear floor pan 6 including a lower face of the recess portion 6a.

As shown in FIG. 1, a fixing member 15 to fix a subframe 14 of the rear suspension to the rear side frame 7 is provided at a portion of the rear side frame lower 8 which corresponds to the above-described rear-end-portion cross member 13. The subframe 14 is provided below the rear side frame 7, which comprises a front cross member 14F which extends in the vehicle width direction, a rear cross member 14R which extends in the vehicle width direction, and a pair of right-and-left side members 14S, 14S which extend in the vehicle longitudinal direction and connect to the respective end portions, in the vehicle width direction, of the front-and-rear cross members 14F, 14R, which are formed integrally.

As shown in FIGS. 1 and 2, the above-described rear side frame lower 8 comprises a bottom wall 8a, a vertical wall 8b which rises upwardly from an inward end, in the vehicle width direction, of the bottom wall 8a, a vertical wall 8c which rises upwardly from an outward end, in the vehicle width direction, of the bottom wall 8a, and flange portions 8d, 8e which extend in the vehicle width direction from respective upper ends of the vertical walls 8b, 8c, which are formed integrally. In FIGS. 1 and 2, reference character 16 denotes a floor side panel which is positioned on an outward side, in the vehicle width direction, of the rear side frame 7.

As shown in FIGS. 1 and 2, the vehicle-body structure (rear vehicle-body structure) of the present embodiment is provided with a pair of right-and-left crash cans 20, 20 which are provided at a rear end portion (an end portion) of a vehicle body, being spaced apart from each other in the vehicle width direction, and a bumper reinforcement 21 which extends in the vehicle width direction and connects respective rear tip portions (respective tip portions) of the crash cans 20, 20.

As shown in FIGS. 1 and 2, a set plate 22 is attached to a rear end of the rear part 7R of the rear side frame 7, and another set plate 23 is attached to a front end portion (a base end portion) of the crash can 20. These set plates 22, 23 are fixedly fastened by using plural fastening members, such as bolts and nuts, whereby the crash can 20 is fixed to the rear end of the rear side frame 7 via the set plates 22, 23. In other words, the crash can 20 is fixed to the rear side frame 7 as a vehicle-body side frame via the set plates 23, 22.

As shown in FIGS. 3, 4 and 5, the crash can 20 is configured to have a cross-shaped hollow closed cross section 24. However, a box-shaped crash can is also applicable.

As shown in FIG. 4, the bumper reinforcement 21 comprises a body part 25 and a closing plate 26 which is fixedly joined to the body part 25 such that plate 26 closes a rear opening of the body part 25. Thereby, the bumper reinforcement 21 has a closed cross section 27 extending in the vehicle width direction.

As shown in FIG. 4 which shows the cross section of the body part 25 of the bumper reinforcement 21, this body part 25 comprises a front wall 25a, an upper wall 25b which extends rearwardly from an upper end of the front wall 25a, an upper rear wall 25c which extends upwardly from a rear end of the upper wall 25b, a turnback section 25d which is configured to be turned back forwardly from an upper end of the upper rear wall 25c, a lower wall 25e which extends rearwardly from a lower end of the front wall 25a, a lower rear wall 25f which extends downwardly from a rear end of the lower wall 25e, and a turnback section 25g which is configured to be turned back forwardly from a lower end of the lower rear wall 25f, which is configured to have a roughly hat-shaped cross section. The closing plate 26 of the bumper reinforcement 21 is fixedly joined to the upper rear wall 25c and the lower rear wall 25f of the body part 25 by means of spot welding.

As shown in FIGS. 1-5, there is provided a brace 30 which extends obliquely, in a plan view, from an inward side, in the vehicle width direction, of the crash can 20 or the set plate 23, actually from an inward side, in the vehicle width direction, of the set plate 23 according to the present embodiment, such that a space 29 is formed, in the vehicle with direction, between the brace 30 and the crash can 20. This brace 30 is fixedly joined to a lower face of the body part 25 of the bumper reinforcement 21.

Thereby, when a collision load is inputted below the bumper reinforcement 21 and the crash can 20, downwardly-rotationally moving of the bumper reinforcement 21 and the crash can 20 is prevented by the brace 30. Further, the space 29 (which is of a right-triangle shape in the plan view according to the present embodiment) is formed, in the vehicle with direction, between the brace 30 and the crash can 20 and the brace 30 is a single member. Thereby, the vehicle-body structure disclosed in the present embodiment does not influence on the vehicle body in a light vehicle collision, thereby securing the repairability.

As shown in FIGS. 1-5, a base portion (front end portion) of the brace 30 is fixed to a face of the set plate 23 which is positioned on an inward side, in the vehicle width direction, of the crash can 20, the brace 30 extends obliquely such that its tip portion (rear end portion) is positioned on the inward side, in the vehicle width direction, of its base portion, and the tip portion (rear end portion) of the brace 30 is fixed to a lower face of the body part 25 of the bumper reinforcement 21.

As shown in FIGS. 4, 5 and 6, the brace 30 comprises a vertical-directional face portion 31 which is fixedly joined to a face of a side of the body part 25 of the bumper reinforcement 21 which is positioned closely to the vehicle body, i.e., joined to the front wall 25a of the body part 25.

The above-described vertical-directional face portion 31 comprises, as show in FIG. 6, a first face portion 31a which is positioned at a tip-side of the brace 30 and has a relatively-low height in a vertical direction and a second face portion 31b which is positioned at a base-end-side of the brace 30 and has a relatively-high height in the vertical direction, an upper end portion of the first face portion 31a is set as a first joint portion 31c to fixed to the lower wall 25e of the body part 25 of the bumper reinforcement 21 by line welding, a tip portion (i.e., a rear end portion) of the second face portion 31b is set as a second joint portion 31d to be fixed to the front wall 25a of the body part 25 of the bumper reinforcement 21 by line welding, and these both joint portions 31c, 31d are fixed to the lower face (lower wall 25e) and the front face (front wall 25a) of the body part 25 of the bumper reinforcement 21.

Thereby, supporting of the bumper reinforcement 21 by the brace 30 is attained with a front-face supporting by the second joint portion 31d of the vertical-directional face portion 31 as well as a lower-face supporting with the first joint portion 31c of the vertical-directional face portion 31, a large support face is secured. Further, an improper arch-shaped deformation of the bumper reinforcement 21 in a case where a collision load is inputted to a central portion, in the vehicle width direction, of the bumper reinforcement 21 is suppressed by the vertical-directional face portion 31 of the brace 30. That is, the bumper reinforcement 21 is generally configured in a curved shape such that its central portion, in a plan view, protrudes outwardly (rearwardly in the case of the rear bumper reinforcement), so that in the case where the collision load is inputted to this central portion, the bumper reinforcement 21 tends to be deformed in an arch shape such that an end portion, in the vehicle width direction, thereof is bent outwardly (rearwardly) as shown by an imaginary line a in FIG. 2. According to the present embodiment, however, since the brace 30 comprises the above-described vertical-directional face portion 31, this arch-shaped deformation of the bumper reinforcement 21 is suppressed by this vertical-directional face portion 31.

As shown in FIGS. 4, 5 and 6, the brace 30 includes a roughly-horizontal face portion 32 which extends outwardly, in the vehicle width direction, from a lower end of the vertical-directional face portion 31, whereby the brace 30 is configured to have an L-shaped cross section. Further, as shown in FIG. 4, the brace 30 is connected to the above-described set plate 23 at its front end portion as its base end portion which is located at a lower level than a cross-sectional center 20CE, in the vertical direction, of the crash can 20.

According to the present embodiment, since the bumper reinforcement 21 which is going to move rotationally downwardly is supported by the brace 30 which is connected to the set plate 23 at its base end portion located at the lower level than the cross-sectional center 20CE, in the vertical direction, of the crash can 20, preventing of the downwardly-rotationally moving of the bumper reinforcement 21 and the crash can 20 is attained.

Additionally, as shown in FIG. 3, the right-and-left crash cans 20, 20, the bumper reinforcement 21, the right-and-left set plates 23, 23, and the right-and-left braces 30, 30 are formed as an integrally-assembled member, which can be attached to the vehicle body by attaching the right-and-left set plates 23, 23 to the right-and-left set plates 22, 22 provided at the rear side frames 7, 7, respectively. Accordingly, in a case where the above-described integrally-assembled member is deformed or broken in the light vehicle collision, the repairability of this member is secured by replacing this member.

Herein, in the figures, an arrow F shows a vehicle forward direction, an arrow R shows a vehicle rearward direction, an arrow IN shows an inward direction in the vehicle width direction, an arrow OUT shows an outward direction in the vehicle width direction, and an arrow UP shows a vehicle upward direction.

As described above, the vehicle-body structure of the present embodiment comprises the pair of right-and-left crash cans 20, 20 provided at the end portion of the vehicle body, being spaced apart from each other in the vehicle width direction, the bumper reinforcement 21 extending in the vehicle width direction and connecting the respective tip portions of the crash cans 20, 20, the set plates 23, 22 interposed between each of the crash cans 20, 20 and the vehicle-body side frame (see the rear side frame 7), wherein each of the crash cans 20, 20 is fixed to the vehicle-body side frame (the rear side frame 7) via the set plates 23, 22, and the brace 30 extending obliquely, in the plan view, from the inward side, in the vehicle width direction, of the crash can 20 or the set plate 23 to the bumper reinforcement 21 such that the space 29 is formed, in the vehicle with direction, between the brace 30 and the crash can 20, wherein the brace 30 is fixedly joined to the lower face of the bumper reinforcement 21 (see FIGS. 1 and 2).

According to this structure, when the collision load is inputted below the bumper reinforcement 21 and the crash can 20, the downwardly-rotationally moving of the bumper reinforcement 21 and the crash can 20 can be prevented by the brace 30.

Further, since the space 29 is formed, in the vehicle with direction, between the brace 30 and the crash can 20 and the brace 30 is the single member, the vehicle-body structure of according to this structure does not influence on the vehicle body in the light vehicle collision, thereby securing the repairability. Thus, preventing of the downwardly-rotationally moving of the bumper reinforcement 21 and the crash can 20 when the collision load is inputted below the bumper reinforcement 21 and the crash can 20 and securing of the repairability in the light vehicle collision can be compatibly attained.

Further, in the present embodiment, the brace 30 comprises the vertical-directional face portion 31 which is fixedly joined to the face of the side of the bumper reinforcement 21 which is positioned closely to the vehicle body (i.e., joined to the front wall 25a in the present embodiment) (see FIG. 4).

According to this structure, since the bumper reinforcement 21 is supported by the brace 30 at its vertical-directional face portion 31 as well as its lower face, the large support face can be secured.

Further, the improper arch-shaped deformation of the bumper reinforcement 21 in the case where the collision load is inputted to the central portion, in the vehicle width direction, of the bumper reinforcement 21 can be suppressed by the vertical-directional face portion 31 of the brace 30. That is, the bumper reinforcement 21 is generally configured in the curved shape such that its central portion, in the plan view, protrudes outwardly (the central portion of the front bumper reinforcement protrudes forwardly, the central portion of the rear bumper reinforcement protrudes rearwardly), so that in the case where the collision load is inputted to this central portion, the bumper reinforcement 21 tends to be deformed in the arch shape such that the end portion, in the vehicle width direction, thereof is bent outwardly (see the imaginary line a in FIG. 2). According to the structure of the present embodiment, however, since the brace 30 comprises the above-described vertical-directional face portion 31, this arch-shaped deformation of the bumper reinforcement 21 can be properly suppressed by this vertical-directional face portion 31.

Moreover, in the present embodiment, the brace 30 is connected to the set plate 23 at its base end portion which is located at the lower level than the cross-sectional center 20CE, in the vertical direction, of the crash can 20 (see FIG. 4).

According to this structure, since the bumper reinforcement 21 which is going to move rotationally downwardly is supported by the brace 30 which is connected to the set plate 23 at its base end portion located at the lower level than the cross-sectional center 20CE, in the vertical direction, of the crash can 20, preventing of the downwardly-rotationally moving of the bumper reinforcement 21 and the crash can 20 can be attained more securely.

In correspondence between the present invention and the above-described embodiment, the vehicle-body side frame of the present invention corresponds to the rear side frame 7 of the embodiment. However, the present invention is not limited to the above-described embodiment. For example, while the above-described embodiment exemplifies the rear vehicle-body structure as the vehicle-body structure, the present invention is applicable to the front vehicle-body structure.

What is claimed is:
1. A vehicle-body structure, comprising:
a pair of right-and-left crash cans provided at an end portion of a vehicle body, being spaced apart from each other in a vehicle width direction;
a bumper reinforcement extending in the vehicle width direction and connecting respective tip portions of the crash cans;
a set plate interposed between each of the crash cans and a vehicle-body side frame, wherein each of the crash cans is fixed to the vehicle-body side frame via the set plate; and
a brace extending obliquely, in a plan view, from an inward side, in the vehicle width direction, of the set plate to the bumper reinforcement such that a space is formed, in the vehicle with direction, between the brace and the crash can,
wherein said brace is fixedly joined to a lower wall of said bumper reinforcement,
the brace comprises a vertical-directional face portion which is fixedly joined to a face of a side of the bumper reinforcement which is positioned closely to the vehicle body,
the vertical-directional face portion of the brace comprises a first face portion which is positioned at a tip-side of the brace with a first height in a vertical direction, and a second face portion which is positioned at a base-end-side of the brace with a second height in the vertical direction, and wherein the first height is smaller than the second height,
the vertical-directional face portion further comprises an upper end portion of the first face portion is set as a first joint portion to fixed to the lower wall of a body part of the bumper reinforcement by line welding, a tip portion of the second face portion is set as a second joint portion to be fixed to the face of the bumper reinforcement by line welding, and both joint portions are fixed to the lower wall and the face of the bumper reinforcement.

2. The vehicle-body structure of claim 1, wherein said brace is connected to said set plate at a base end portion thereof which is located at a lower level than a cross-sectional center, in a vertical direction, of said crash can.

3. The vehicle-body structure of claim 1, wherein said brace includes a roughly-horizontal face portion which extends outwardly, in the vehicle width direction, from a lower end of the vertical-directional face portion, such that the brace has an L-shaped cross section.

* * * * *